United States Patent [19]

Nguyen et al.

[11] Patent Number: 5,564,052
[45] Date of Patent: Oct. 8, 1996

[54] LOGICALLY DISCONNECTABLE VIRTUAL-TO-PHYSICAL ADDRESS TRANSLATION UNIT AND METHOD FOR SUCH DISCONNECTION

[75] Inventors: De H. Nguyen, Milpitas; Raymond M. Chu, Saratoga, both of Calif.

[73] Assignee: Integrated Device Technology, Inc., Santa Clara, Calif.

[21] Appl. No.: 303,272

[22] Filed: Sep. 7, 1994

Related U.S. Application Data

[63] Continuation of Ser. No. 722,030, Jun. 27, 1991, abandoned.

[51] Int. Cl.⁶ ............................................. G06F 1/32
[52] U.S. Cl. ..................... 395/800; 395/417; 395/750; 365/49; 364/253; 364/256.4; 364/273.3; 364/DIG. 1
[58] Field of Search ................................ 395/800, 425, 395/400, 417, 750; 365/49; 364/253, 256.4, 273.3, DIG. 1

[56] References Cited

U.S. PATENT DOCUMENTS

| 3,958,126 | 5/1976 | Bryant | 250/554 |
|---|---|---|---|
| 4,146,928 | 3/1979 | Miles | 364/712 |
| 4,435,754 | 3/1984 | Chow et al. | 395/400 |
| 4,473,878 | 9/1984 | Zolnowsky et al. | 395/400 |
| 4,570,239 | 2/1986 | Carter et al. | 365/203 |
| 4,638,426 | 1/1987 | Chang et al. | 395/400 |
| 4,821,169 | 4/1989 | Sites et al. | 395/425 |
| 5,107,417 | 4/1992 | Yokoyama | 395/500 |
| 5,237,671 | 8/1993 | Freitas et al. | 395/425 |
| 5,325,507 | 6/1994 | Freitas et al. | 365/49 |

*Primary Examiner*—Alyssa H. Bowler
*Assistant Examiner*—John Harrity
*Attorney, Agent, or Firm*—Skjerven, Morrill, MacPherson, Franklin & Friel

[57] ABSTRACT

A method and structure for logically disconnecting an on-chip virtual-to-physical address translation unit from a microprocessor by holding the dynamic circuits of the translation unit in precharged state. In one embodiment, the method and structure provide a fixed remapping for the virtual address. A powering down of the translation unit effects power savings when the translation unit is not required.

14 Claims, 10 Drawing Sheets

LOGICALLY DISCONNECTABLE VIRTUAL-TO-PHYSICAL ADDRESS TRANSLATION UNIT AND METHOD FOR SUCH DISCONNECTION

This application is a continuation application Ser. No. 07/722,030, filed Jun. 27, 1991, now abandoned.

FIELD OF THE INVENTION

This invention relates to integrated circuit designs, and in particular, relates to designs of integrated circuits with power down features.

BACKGROUND OF THE INVENTION

A computer system supporting a virtual memory typically uses a translation unit to map virtual memory addresses to physical memory addresses. Since technological developments have made further miniaturization possible, a microprocessor can now integrate a translation unit on-chip. The advantages of such a design can be illustrated, for example, by a cache memory. By locating a cache memory and a translation unit on the same chip as a processor, the speed advantage achieved by a cache memory can be further increased. However, because of the dynamic circuitry used to enhance performance, a translation unit consumes a significant amount of power. Such power consumption becomes wasteful in some applications which do not require the use of the translation unit. Thus, the utility of a microprocessor which contains a translation unit can be enhanced if the translation unit is effectively removable at the user's option. Such an integrated circuit can then be used for applications that do not require the translation unit, without incurring the dissipation of excess power by the translation unit.

SUMMARY OF THE INVENTION

A method and a structure are provided in a microprocessor for disabling an on-chip translation unit, when the application in which the microprocessor is deployed does not require the use of such translation unit. The present invention prevents incurring power dissipation in the dynamic circuits of the translation unit by holding precharged lines in a precharged state. In one embodiment, when the on-chip translation unit is disabled, the present invention provides a fixed remapping of the virtual addresses.

The present invention is especially advantageous in an application, such as an embedded controller application, in which low power operation is desired and very little or no use of a virtual memory system is required. The present invention has no impact on the speed of the microprocessor. As a result of the present invention, two versions of the microprocessor can be provided from the same integrated circuit design, with version selection effectuated by one simple step in the manufacturing process, or when deployed in the target application.

The present invention is better understood after consideration of the following detailed description and the accompanying drawings.

BRIEF DESCRIPTION OF THE DRAWINGS

FIG. 1b is a block diagram of processor 101 of FIG. 1a.

Detailed Description of the Preferred Embodiments

Figure 1A:
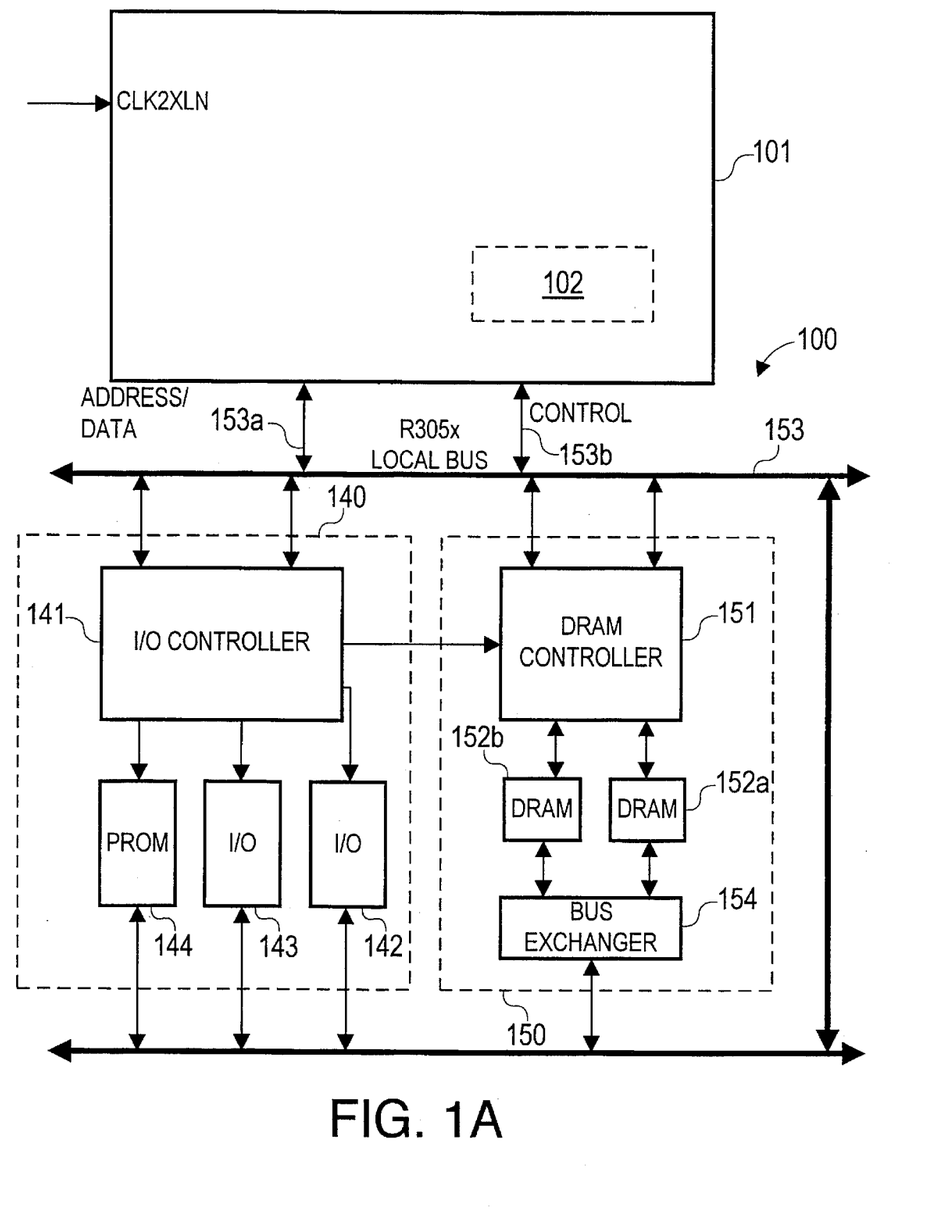
FIG. 1a shows a computer system 100 having a processor 101 with an on-chip instruction cache system 102 and a main memory system 150 external to the processor, in accordance with the present invention.

FIG. 1a shows, as an example, a computer system 100 having a processor 101 with an on-chip cache system 102 and a main memory system 150 external to the processor, in accordance with the present invention.

As shown in FIG. 1a, external memory ("main memory") system 150, which is interfaced to the processor 101 over a bus 153, comprises a dynamic random access memory (DRAM) controller 151, a main memory 152 implemented by banks 152a and 152b of DRAMs and a bus interface 154. In addition, the address space of computer system 100 is also used to access other memory-mapped devices such as I/O controller 141, I/O devices 142 and 143, and programmable read-only memory (PROM) 144. To facilitate reference, the memory-mapped devices other than the main memory 150 defined above are collectively referred to as the I/O system 140, even though read-only memories, such as PROM 144, are often not considered part of the I/O system. I/O system 140 is also interfaced to the bus 153. Bus 153 comprises address/data bus 153a and control bus 153b. Memory data and memory addresses are time-multiplexed on the 32-bit address/data bus 153a. Other device configurations using the memory address space are also possible within the scope of the present invention.

Figure 1B:
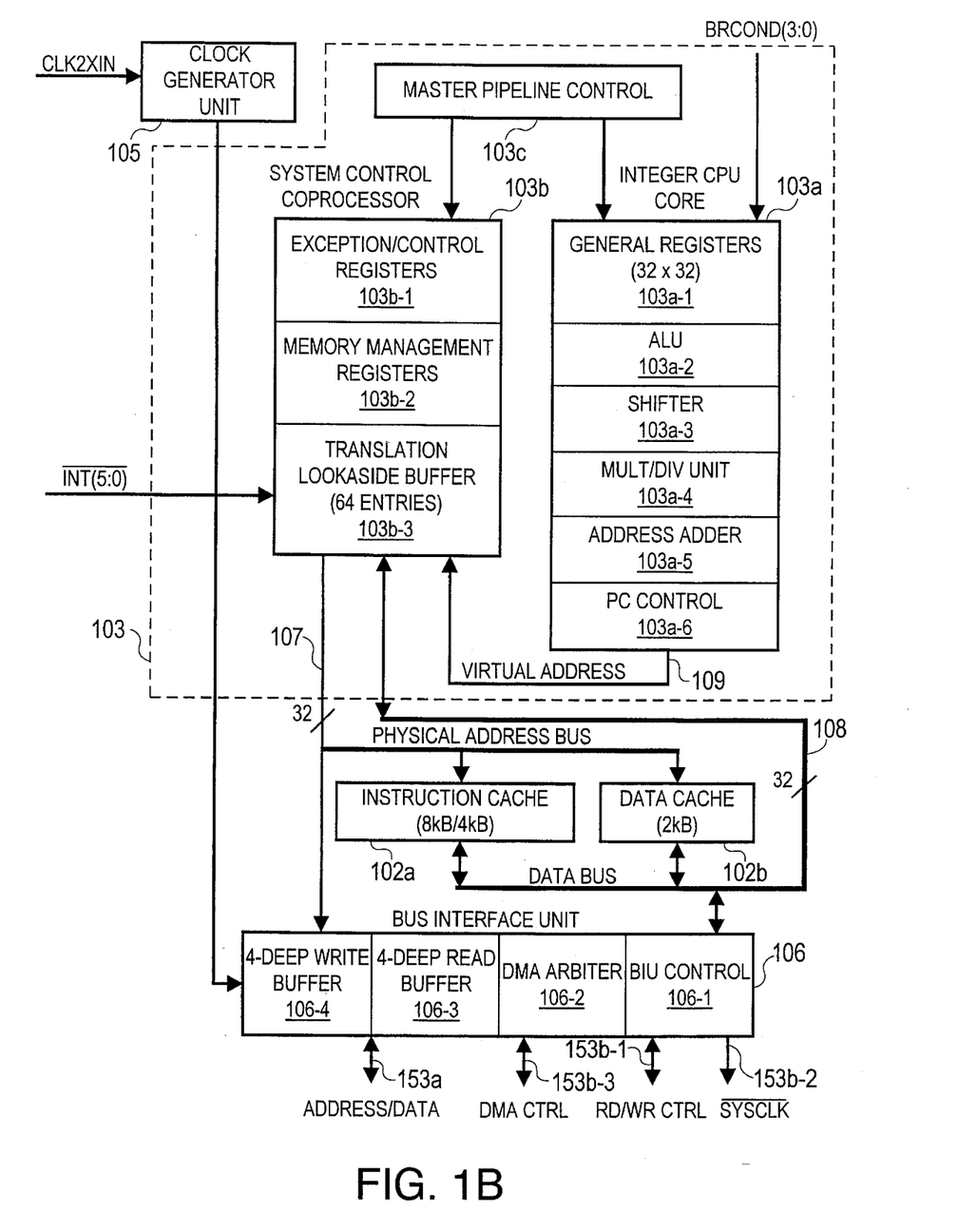

The organization of processor 101 is shown in FIG. 1b. As shown in FIG. 1b, processor 101 includes two co-processors 103a and 103b, controlled by a master pipeline control unit 103c. Coprocessor 103a is also referred to as the integer CPU, and includes 32 32-bit general registers 103a-1, an ALU 103a-2, a shifter 103a-3, a multiplication and division unit 103a-4, an address adder 103a-5, and program counter control unit 103a-6. Processor 103a executes the instruction set known as the MIPS-I Instruction Set Architecture (ISA). Coprocessor 103b, also known as the System Control Coprocessor, comprises exception/control registers 103b-1, a memory management registers unit 103b-2 and a translation look-aside buffer (TLB) 103b-3. The TLB unit 103b-3 provides a mapping between virtual and physical addresses. The TLB unit 103b-3 has a 64-entry look-up table to provide mapping between virtual and physical addresses efficiently.

In this embodiment, the TLB unit 103b-3 is provided at the user's option. The TLB unit 103b-3 can be disabled or "shut down" by applying a logic high signal on the RESVD [4:3,1] pins of the processor 101. The logic high states on this pin blow an internal fuse. When this internal fuse is blown, a control signal TLBKILL is set to a logic high state. RESVD[4:3,1] pins are provided with weak pull-down devices to keep the pins at logic low states to avoid this internal fuse from being blown accidentally. Thus, chips of both versions of the microprocessor, with or without the TLB, can be fabricated using the same mask set, the same fabrication process and on the same wafer. The circuits (to be discussed below) provided in the present invention to allow "shutting down" TLB 103b-3 are relatively simple so that no performance impact is required to provide such benefit. Furthermore, because the present invention provides that very little power is consumed when TLB 103b-3 is shut down, the present invention with the disabled TLB 103b-3 can be used in low power applications.

The coprocessor units 103a and 103b, and the pipeline control unit 103c are collectively referred to as the CPU core 103. The cache system 102 of processor 101 comprises two cache memories 102a and 102b. Cache 102a is an instruction cache. In this embodiment shown, the capacity of cache 102a can be 4K or 8K bytes, and block fill and line sizes of four memory words each. Cache 102b is a data cache, and has a selectable block refill size of one or four memory words, a line size of one memory word, and a capacity of 2K bytes. Other cache, block refill and line sizes can be provided within the scope of the present invention. Both the capacities of cache 102a and cache 102b, and their respective block refill and line sizes, are matters of design choice. In addition, it is also not necessary to provide separate data and instruction caches. A joint data and instruction cache is also within the scope of the present invention. The TLB unit 103b-3 receives from the Integer CPU 103a on bus 109 a virtual address and provides to either cache 102a or cache 102b on bus 107 the corresponding physical memory address. Although cache addressing using virtual addresses is also possible, by using physical addressing in the instruction and data caches, the present embodiment simplifies software requirements and avoids the cache flushing operations necessary during a context switch in a virtually addressed cache.

The cache addressing scheme of the present embodiment is discussed below in conjunction with FIG. 2. Other cache addressing schemes are also possible within the scope of the present invention. Bus interface unit (BIU) 106 interfaces processor 101 with the main memory 150 when a read or write access to main memory is required. BIU 106 comprises a 4-deep write buffer 106-4, a 4-deep read buffer 106-3, a DMA arbiter 106-2 and BIU control unit 106-1. BIU control unit 106-1 provides all control signals on bus 153b, which comprises buses 153b-1 to 153b-3 necessary to interface with the main memory 150 and the I/O system 140. Both addresses and data are multiplexed on the address/data bus 153a, and the control signals are provided on the control bus 153b-1, the system clock signal 153b-2, and the DMA control bus 153b-3.

Figure 2:
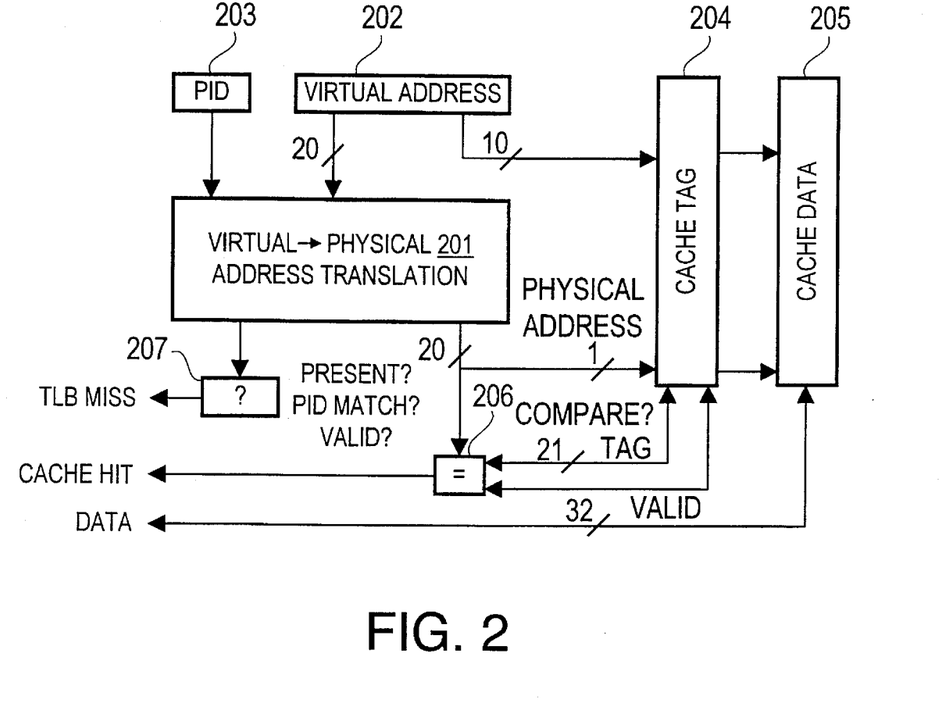
FIG. 2 is a block diagram showing the addressing scheme used in the instruction cache 102a of cache system 102 of FIGS. 1a and 1b.

FIG. 2 is a block diagram showing the addressing scheme used in the instruction cache 102a of the cache system 102, which is shown in FIGS. 1a and 1b. As shown in FIG. 2, the higher order 20 bits of a virtual address (generated by CPU core 103, as shown in FIG. 1b), which is represented by block 202, is provided to the cache addressing mechanism represented by block 201. The remaining 10 bits of the memory word address are common between the virtual and the physical addresses. (The lowest two bits are byte addresses, which are not used in cache addressing.) These common bits are directly provided to index into the cache memory 102a, represented by blocks 204 and 205. Block 205 represents the data portion of the cache line, which comprises four 32-bit memory words in this embodiment. Block 204 represents the "tag" portion of the cache data word; this tag portion contains both a "valid" bit and the higher order 20 bits of the memory word addresses of the data words stored in the cache line. (Since the addresses of memory words within the cache line are contiguous, the higher order 20 bits are common to all of the memory words in the cache line). The valid bit indicates that the cache word contains valid data. Invalid data may exist if the data in the cache does not contain a current memory word. This condition may arise, for example, after a reset period.

When the TLB 103b-3 is enabled, each virtual address is associated with a particular process identified by a unique "process id" PID, which is represented by block 203. Block 201 represents the virtual address to the physical address translation, which is performed using the TLB unit 103b-3 when the TLB is enabled (FIG. 1b). As will be shown below, each entry in the TLB is also associated a "global bit". When the TLB is enabled, a TLB miss occurs if either a mapping between the virtual address and the corresponding physical address cannot be found in the 64 entries of the TLB unit 103b-3, the PID stored in the TLB unit 103b-3 does not match the PID of the virtual address, or if the valid bit in the data word is not set. Block 207 represents the determination of whether a TLB miss has occurred. The TLB miss condition raises an exception condition, which is handled by CPU core 103. This exception condition is described in detail in the "IDT79R3051 Hardware User's Manual," available from Integrated Device Technology, Inc., Santa Clara, Calif., herein incorporated by reference in its entirety. If a virtual address to physical address mapping is found, the higher order 20 bits of the physical memory word address is compared (block 206) with the memory address portion of the tag. The valid bit is examined to ensure the data portion of the cache line contains valid data. If the comparison (block 206) indicates a cache hit, the selected 32-bit word in the cache line is the desired data.

Figure 3:
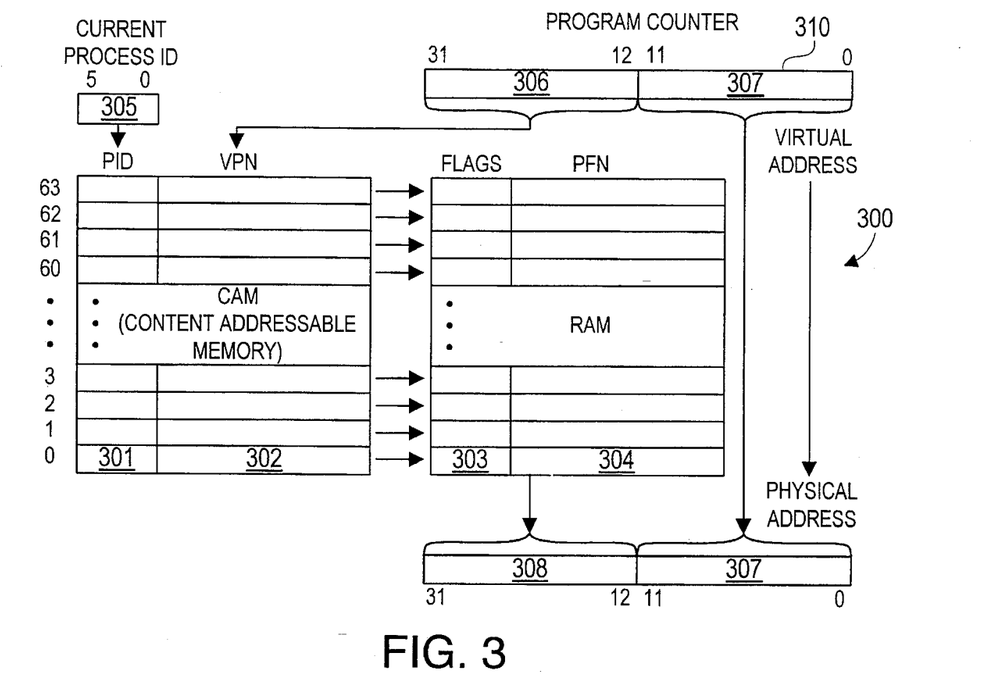
FIG. 3 is a block diagram illustrating virtual-to-physical address translation in processor 101, when TLB 103b-3 is enabled.

The structure of TLB 103b-3 is represented by the block diagram 300 of FIG. 3. As shown in FIG. 3, TLB 103b-3 holds 64 entries. Each entry comprises a "process id" PId field (301), a "virtual page number" field VPN (302), a "flags" field (303), and a "page frame number" field PFN (304). The PId field 301 contains a 6-bit identification PId for the process in which the virtual address resides. The higher 20 bits VA[31:12] of a 32-bit virtual address VA[31:0] is known as the VPN. The flags field 303 is a field comprising status bits "valid", "dirty", "non-cacheable", and "global". The "valid" bit indicates that the TLB entry is initialized and contains valid data. The dirty bit indicates that the page contains "writeable" data. The "non-cacheable" bit indicates that the page can only be obtained from main memory. The "global" bit indicates that the PId field should be ignored when determining whether a TLB miss occurs.

In this embodiment, the VPN and PID fields are implemented by content-addressable memory (CAM) circuits and the flags and the PFN fields are implemented by random access memory (RAM) circuits. FIG. 3 also illustrates the translation of an instruction address. As shown in FIG. 3, the program counter (represented by box 310) contains a virtual address VA[31:0] in the address space of a given process PId (represented by box 305). In this example, virtual address VA[31:0] is the virtual address of an instruction. As mentioned above, to fetch such an instruction, the higher 20 bits VA[31:12], i.e. the VPN, and the PId are matched against the corresponding fields in each of the 64 entries in TLB 103b-3. A TLB miss occurs if no match is found. (Note that when a TLB hit occurs, both VPN and PId fields are matched to the corresponding PId and address VA[31:12], unless the global bit is set, in which case a match in the VPN field only is required.)

In this embodiment, the virtual address space is divided into "user" and "kernel" spaces. The user space (user segment "kuseg," virtual addresses between 0x00000000 and 0x7fffffff) is 2 Gigabytes. The "kernel" space, which is further divided into kernel segments "kseg0," "kseg1," and "kseg2", is also 2 Gigabytes. Kernel segments kseg0 (256 megabytes, virtual addresses between 0x80000000 and 0x9fffffff) and kseg2 (1 gigabytes, virtual addresses between 0xc0000000 and 0xffffffff) are cacheable, and kernel segment kseg1 (512 megabytes, virtual addresses between 0xa0000000 and 0xbfffffff) is uncacheable. Kernel segments kseg0 and kseg1, which contain boot procedures and input/output service routines, are required to be mapped into the physical addresses between 0x00000000 and 0x1fffffff. When TLB 103b-3 is enabled ("dynamic mapping"), kernel segment kseg2 and user segment kuseg can be mapped into anywhere in the physical address space between 0x00000000 and 0xffffffff. However, if TLB 103b-3 is disabled in accordance with the present invention, processor 101 provides a fixed mapping scheme between the virtual address and the physical address space. This fixed mapping scheme is illustrated by FIG. 4.

Figure 4:
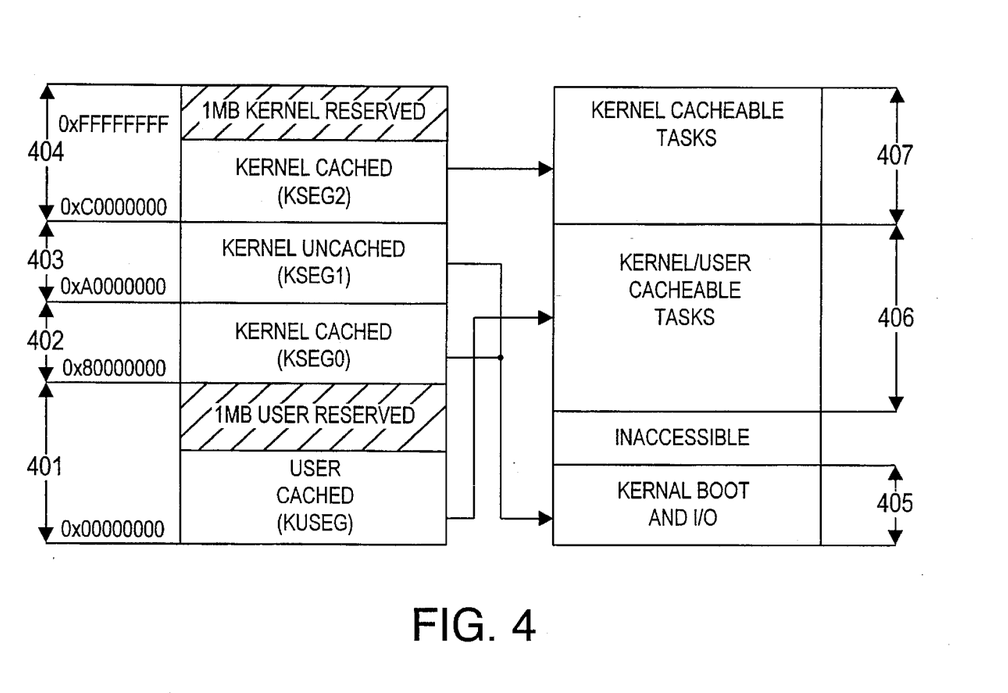
FIG. 4 iillustrates the processor 101's fixed virtual-to-physical memory mapping scheme when TLB 103b-3 is disabled.
Figure 6A:
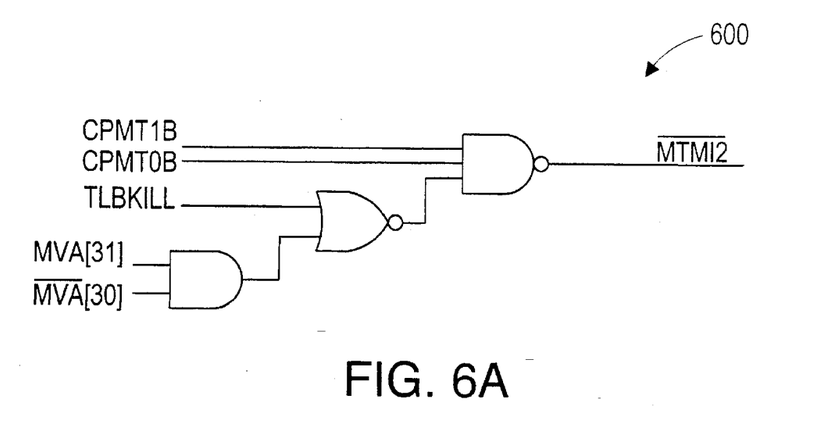
FIG. 6a shows a logic circuit 600, which suppresses a "micro__TLB miss" signal, in accordance with the present invention.
Figure 6B:
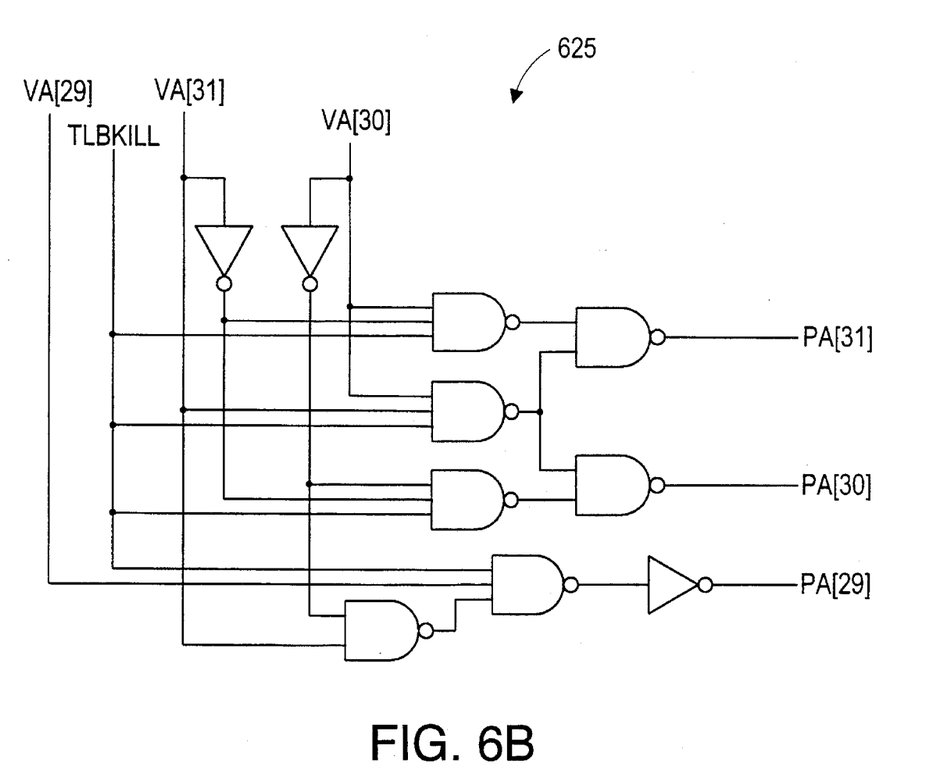
FIG. 6b shows a logic circuit 625, which provides a mapping of a virtual address VA[31:0] to a physical address PA[31:0] by modifying the values of three bits VA[31:29] according to a fixed virtual-to-physical mapping scheme, when the TLB 103b-3 is disabled, in accordance with the present invention.

As shown in FIG. 4, under the fixed virtual-to-physical mapping ("base") scheme, user segment kuseg (401) is mapped into the physical addresses between 0x40000000 and 0xbfffffff (represented by the range 406). Thus, the physical address PA[31:0] can be obtained from the virtual address VA[31:0] by translating the two highest order bits of the virtual address (i.e. VA[31:30]) from a bit pattern '00' or '01,' to a bit pattern '01' or '10.' Kernel segment kseg2 (404) is translated unmodified to the physical addresses between 0xc0000000 to 0xffffffff (i.e. PA[31:0] is the same as VA[31:0]) indicated by range 407. The translation of a virtual address in either kernel segments kseg0 (402) and kseg1 (403) is accomplished by setting the bits VA[31:29] to a bit pattern '000', thereby mapping the virtual address into one of the physical addresses between 0x00000000 and 0x1fffffff (range 405). One circuit 600 suitable for providing this fixed virtual-to-physical mapping scheme is shown in FIG. 6b. Under this fixed virtual-to-physical mapping scheme, kernel segment kseg1 is uncacheable, and kernel segments kseg0 and kseg2 and user segment kuseg are cacheable.

Figure 6C:
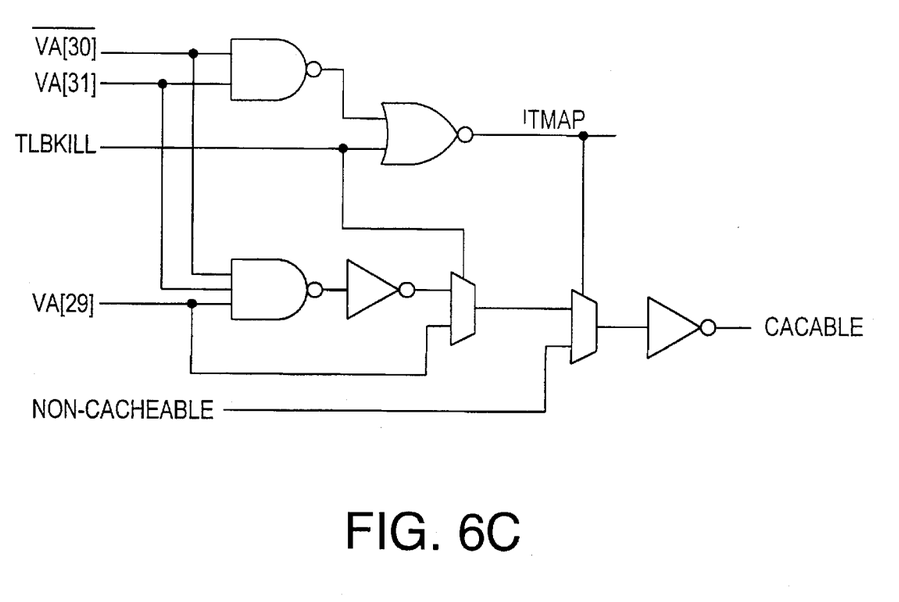
FIG. 6c shows, in accordance with the present invention, a logic circuit 650, which disables the dynamic mapping of the virtual address segments kseg2 and kuseg when the TLB 103b-3 is disabled. Circuit 650 also provides a signal CACABLE which indicates whether the virtual address VA[31:0] belongs to a cacheable segment under the virtual-to-physical address mapping scheme.

When TLB 103b-3 is enabled, control signals for mapping kernel and user segments kseg2 and kuseg are activated when the virtual address bit VA[31] is '0' or VA[30] is '1.' (i.e. the virtual address is in "map space"). When TLB 103b-3 is enabled, a control signal ITMAP indicating that the virtual address received is in map space is used to activate the mapping circuitry. When TLB 103b-3 is disabled, the TLBKILL signal suppresses ITMAP from being asserted even if the virtual address is detected to be in map space. By suppressing ITMAP, the control signals for dynamic mapping are effectively shut down. A circuit 650 shown in FIG. 6c can be used to suppress ITMAP. Circuit 650 also provides a control signal CACABLE, which when asserted, indicates that the current virtual address is one belonging to a cacheable location. In this embodiment, virtual addresses in kernel segment kseg0 are cacheable and virtual addresses in kernel segment kseg1 are always uncacheable. Cacheability in the other segments kseg2 and kuseg depends upon whether TLB 103b-3 is enabled, i.e. the status of the signal TLBKILL. When TLB 103b-3 is enabled, an address belonging to either kernel segment kseg2 or user segment kuseg is cacheable if the "non-cacheable" flag in the matching entry of the TLB 103b-3 is not set. If the "non-cacheable" flag is set, the virtual address is in uncacheable space. However, if TLB 103b-3 is enabled, all virtual addresses in both kernel segment kseg1 and user segment kuseg are cacheable. Circuit 650 detects these conditions according to the status of the signal TLBKILL.

Under the fixed virtual-to-physical mapping scheme, the upper 1 megabytes of both kernel segment kseg2 and user segment kuseg are reserved.

Figure 5:
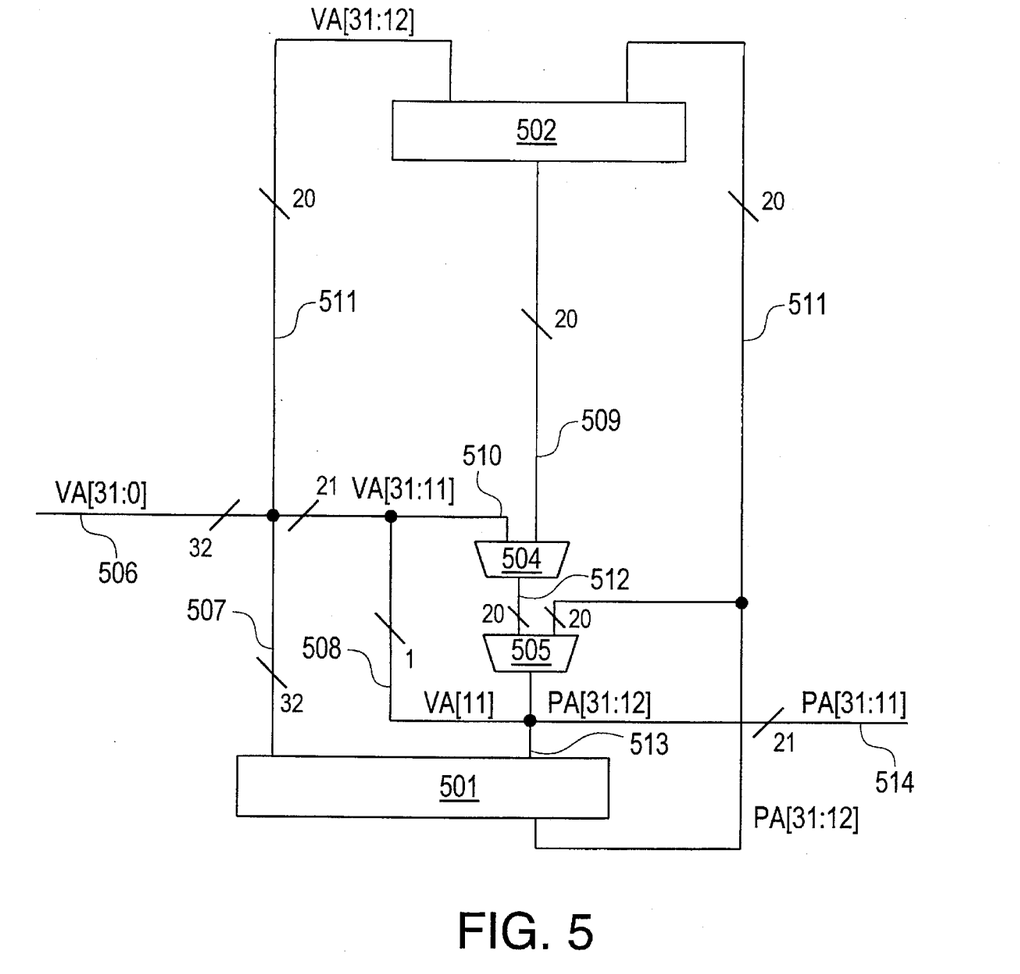
FIG. 5 shows the datapath architecture of the TLB 103b-3.

FIG. 5 is a block diagram of the datapath in TLB 103b-3. As shown in FIG. 5, TLB 103b-3 comprises the buffer 501, a "micro-TLB" structure 502, and multiplexers 504 and 505. The buffer 501 contains the 64 entries of a translation table, as discussed above. Micro-TLB 502 contains the VPN and PFN fields of the most recently referenced two entries of the 64 entries contained in buffer 501. Micro-TLB structure 502 acts as a cache structure for buffer 501, and has even higher performance than buffer 501. When a virtual address VA[31:0] on bus 506 requires a virtual-to-physical address translation at TLB 103b-3 (i.e. in map space), the higher 20 bits VA[31:12] are first compared to the content of the micro-TLB 502. As mentioned above, Micro-TLB 502 contains the VPN and PFN fields of two entries in buffer 501. (The PID and global bit fields are assumed unchanged from the last time the translation table entry is referenced). If VA[31:12] matches the VPN field in one of the two entries in micro-TLB 502, indicated by one of the control signals $\overline{\text{CPMT0}}$ and $\overline{\text{CPMT1}}$ (not shown), the corresponding PFN field is output on bus 509 and, through multiplexers 504 and 505, is provided as the physical address PA[31:12] on bus 514. Bit PA[11] of bus 514 is identical to virtual address bit VA[11].

If the virtual address bits VA[31:12] do not match the VPN fields in either entries of the micro-TLB 502, a "micro-TLB miss" is said to have occur. Since micro-TLB is of a higher performance than buffer 501, considerable speed is gained by using the micro-TLB 502.

When a micro-TLB miss occurs, buffer 501 is accessed. VA[31:0] is supplied on bus 507 to the buffer 501, and if a match is found between the higher order 20 bits VA[31:12] of the input virtual address VA[31:0] and the VPN of any one of the 64 entries in the buffer 501, (and provided a match is also found in the PId field, if appropriate), the PFN field is output on bus 511 as the physical address bits PA[31:12]. These physical address bits PA[31:12] are simultaneously output on bus 514 and loaded into the entry of the micro-TLB 502 which did not match in the last access to the micro-TLB 502. Again, the virtual address bit VA[11] provides the physical address bit PA[11]. When a match is not found in any of the 64 entries of buffer 501, a TLB miss occurs, as discussed above.

When the TLB 103b-3 is disabled, multiplexers 504 and 505 allow the bits VA[31:12] on bus 510 to "flow through"

as the physical address bits PA[31:12] on bus 514, after the first three bits of VA[31:12] are modified by a circuit, such as circuit 625 of FIG. 6b, in accordance with the fixed virtual-to-physical mapping scheme discussed above. To disable the control signals used to initiate an access to buffer 501, a circuit 600 shown in FIG. 6a is provided to disable the access to buffer 501 via signal $\overline{\text{MTMI2}}$. $\overline{\text{MTMI2}}$ indicates, when TLB 103-b is enabled, whether a micro-TLB miss occurred. (A micro-TLB miss occurs when neither control signals $\overline{\text{CPMT1}}$ and $\overline{\text{CPMT0}}$ are asserted). Thus, the control logic for buffer 501 is handled, when TLB 103b-3 is disabled, in the same manner as when a micro-TLB hit occurs.

Figure 7A:
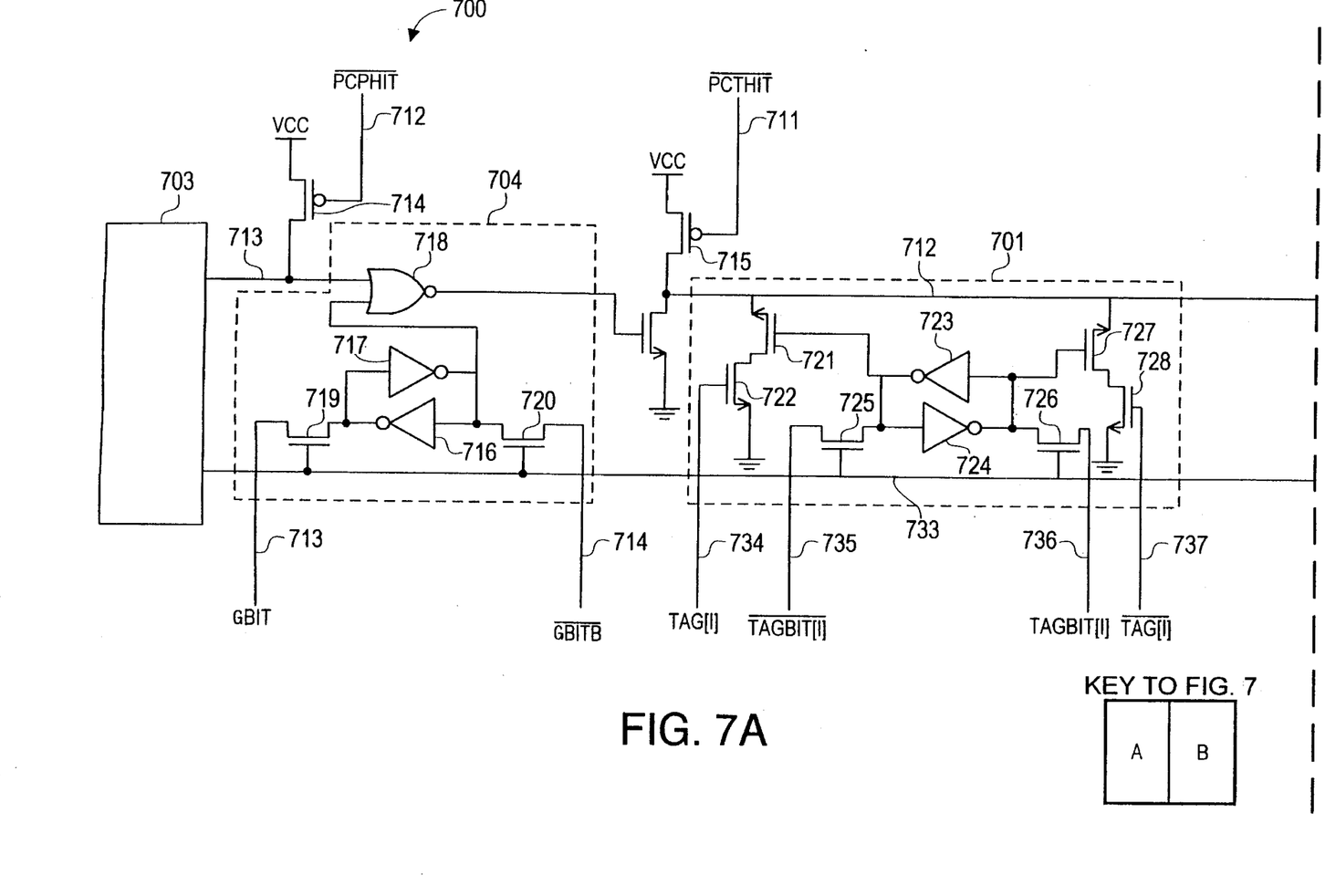
FIG. 7 is a schematic circuit 700 of one entry of buffer 501 in TLB 103b-3; to simplify the schematic circuit, only one bit-slice of the PId field, the VPN field, and the PFN fields are shown.
Figure 7B:
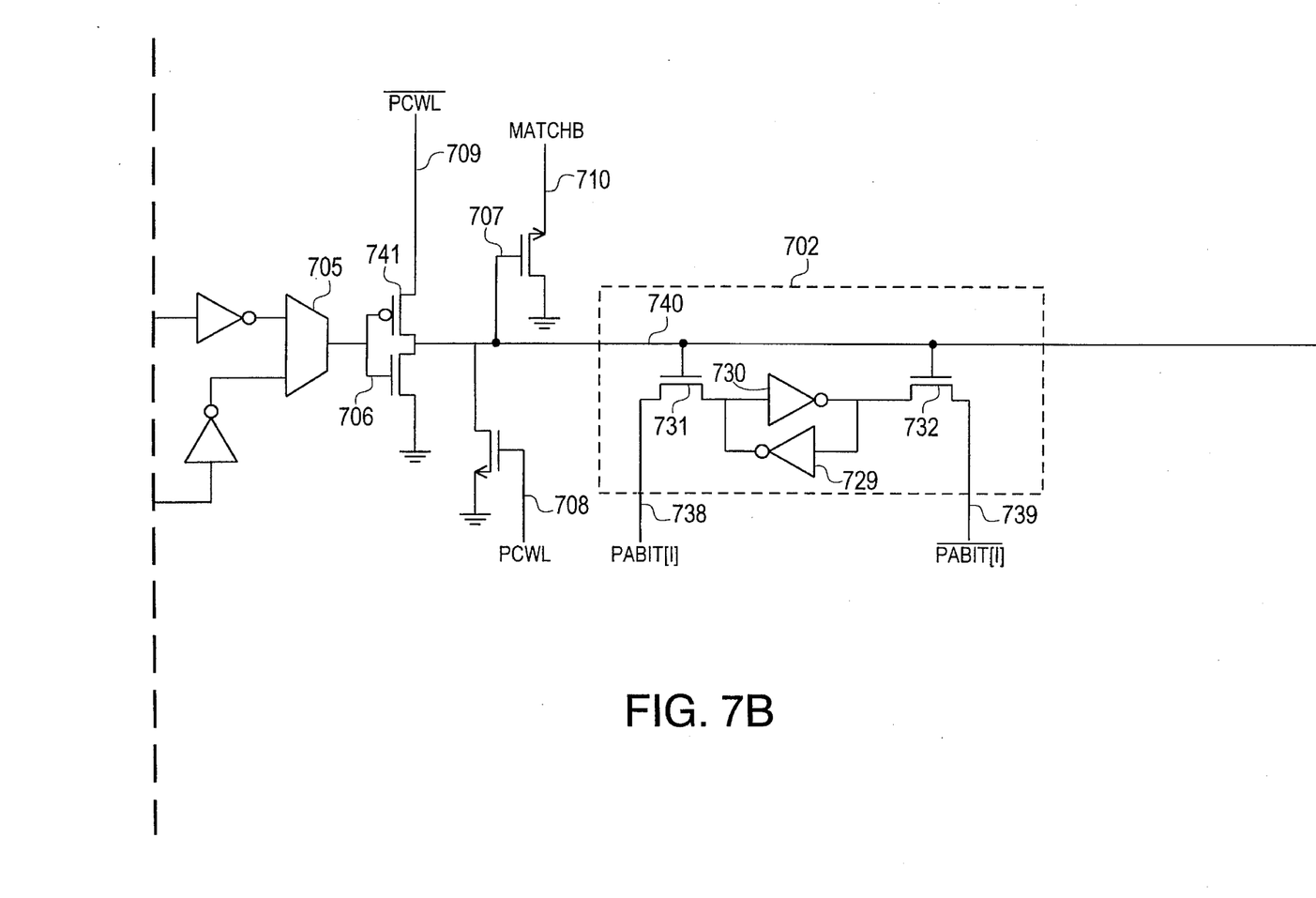

Buffer 501 consumes a significant amount of power when evaluating whether the PId and/or VPN fields of the 64 entries are matched by the input virtual address. This power is consumed because dynamic circuits involving precharging are used to increase performance. FIG. 7 is a schematic diagram of one entry of buffer 501. To simplify FIG. 7, only one bit each of the PId (shown as cell 703), global bit (shown as cell 704), VPN (shown as cell 701) and PID/flag (shown as cell 702) fields are shown. As discussed above, the VPN and the PId fields are implemented by CAM, and the flag and PFN fields are implemented by RAM. Hence, cell 703 is identical to cell 701. Similarly, there is no difference between the RAM circuits implementing a flag bit and a PFN bit.

In order to evaluate whether a match is found in the VPN and PID fields, control signals $\overline{\text{PCPHIT}}$ and $\overline{\text{PCTHIT}}$ are asserted to enable transistors 716 and 715 to precharge the PIDHIT line 713 (PId field) and the TAGHIT line 712 (VPN field) respectively.

As shown in cell 701, a comparator is formed by transistors 721, 722, 727 and 728. The gates of transistors 722 and 728 are controlled by complementary signals TAG[i] 734 and $\overline{\text{TAG[i]}}$ 737, representing one bit of the input virtual address to be compared. (In cell 703, the corresponding signals are complementary signals representing one bit of the PId). The gates of transistors 721 and 727 are controlled by the complementary signals of the corresponding VPN bit (in cell 703, a corresponding PId bit) stored in the latch formed by cross-coupled transistors 723 and 724. If a match is found, the charge on the TAGHIT line 712 is left undischarged indicating a "tag hit". Otherwise, a mismatch in any bit will discharge the TAGHIT line 712 to pull the TAGHIT line 712 to ground voltage. When a new VPN (and PId) is loaded, the INDEX line 733 is turned on, so that the bit TAGBIT[i] 736 in cell 701 and its complementary signal $\overline{\text{TAGBIT[i]}}$ 735 (PIdBIT[i] and $\overline{\text{PIdBIT[i]}}$ in cell 703) can be stored into the latch formed by cross-coupled transistors 723 and 724 via transfer transistors 725 and 726.

The global bit is stored in each entry of buffer 501 by a storage device, such as cross-coupled inverters 716 and 717, via transfer transistors 719 and 720. A NOR gate 718 is provided, so that if the stored global bit indicates that the PId is to be ignored in the matching process, the output of the NOR gate 718 indicates a PId hit, regardless of whether a PId hit actually occurred.

When the TAGHIT line 712 line indicates a TLB hit, word line 740 is driven to logic high by the signal $\overline{\text{PCWL}}$ on lead 709 to turn on transfer transistors 731 and 732, so that complementary signals stored in RAM cell 702 (corresponding to a flag or PFN bit) is provided on leads PABIT[i] 738 and $\overline{\text{PABIT[i]}}$ 739. When TAGHIT line 712 indicates a TLB hit, the precharged match line 710 is also pulled to ground voltage. When loading cell 702, the same precharged line 710 turns on transfer transistors 731 and 732, so that complementary bit values on PABIT[i] 738 and $\overline{\text{PABIT[i]}}$ 739 are written into the latch formed by cross-coupled inverters 729 and 730.

In buffer 501, dynamic power is consumed by the precharging and discharging lines TAGHIT line 712, PIDHIT line 713, $\overline{\text{PCWL}}$ line 709, PABIT[i] line 738, $\overline{\text{PABIT[i]}}$ line 739 and by driving TAG[i] line 734 and $\overline{\text{TAG[i]}}$ line 737. Hence, in accordance with the present invention, when the TLB 103b-3 is disabled, logic circuits are provided such that the TLBKILL signal causes both input bits of each bit in the CAM portion of each entry of buffer 501 to be driven to ground state. For example, TAG [i] 734 and $\overline{\text{TAG [i]}}$ 737 are driven to ground state. As a result, the precharged lines TAGHIT line 712 and PIDHIT line 713 are held at the precharged state and are not discharged. Further, when the TLBKILL signal is active, signal $\overline{\text{PCWL}}$ on line 709 is held at ground voltage, thereby preventing word line 740 from being driven to logic high voltage. Thus, with all the word lines being held at ground voltage, the precharged bit lines PABIT[i] 738 and $\overline{\text{PABIT[i]}}$ 739 are not discharged to ground voltage. Hence, because all the precharged signals are held in precharged states, and not discharged, no significant dynamic power is consumed in buffer 501.

Figure 8:
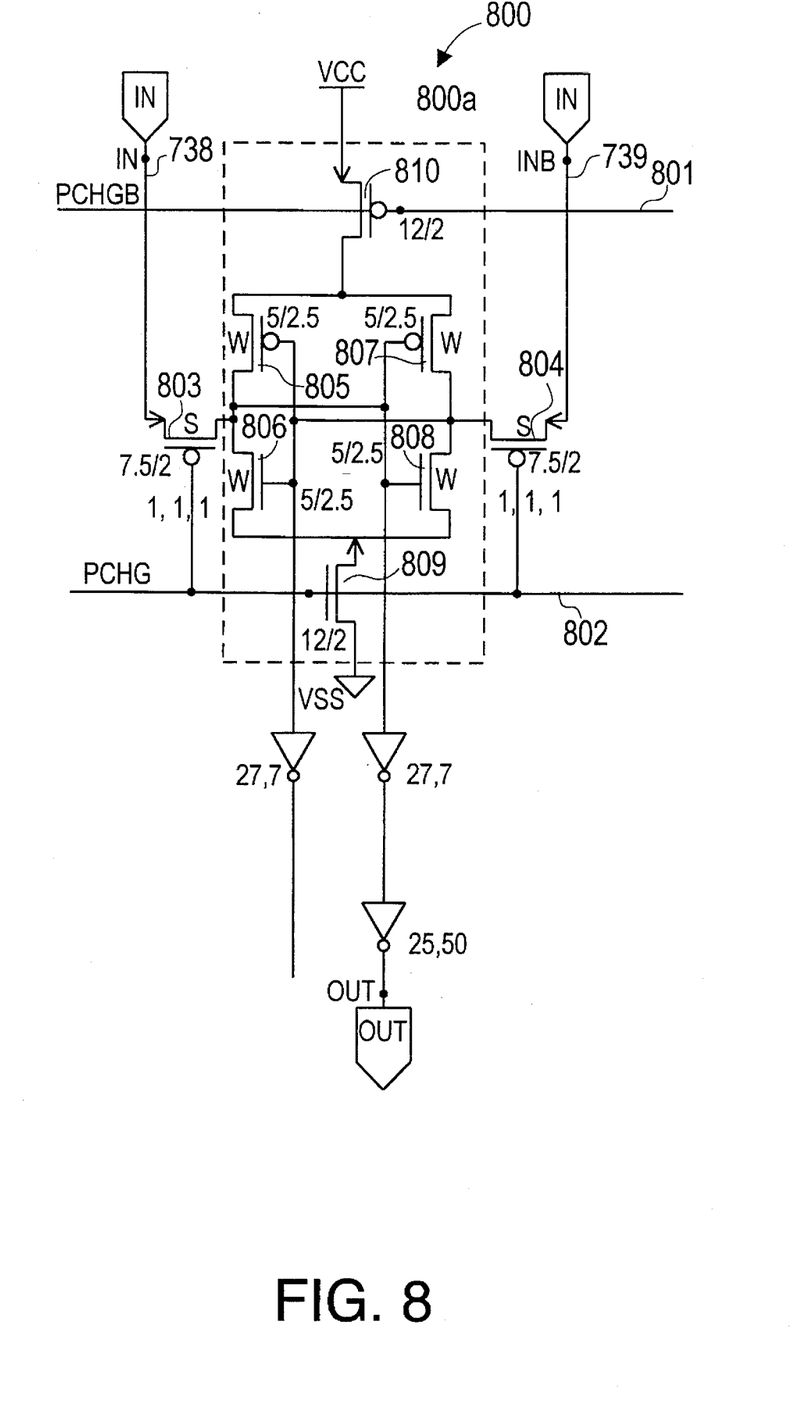
FIG. 8 is a schematic circuit 800 of a sense amplifier bit slice, which is disabled when the TLB 103b-3 is disabled.

Each bit in the RAM portion (i.e. flag and PFN fields) of each entry of buffer 501 are connected to a sense amplifier. For example, PABIT[i] 738 and its complementary signal $\overline{\text{PABiT[i]}}$ 739 are connected to inputs of a sense amplifier circuit, such as circuit 800 shown in FIG. 8. As shown in FIG. 8, sense amplifier 800 comprises PMOS transfer transistors 803 and 804 and a differential amplifier 800a formed by transistors 805, 806, 807, 808, 809 and 810. When TLB 103b-3 is enabled, the signal on PCHG 802 is allowed to switch between logic high and logic low states. When PCHG is at logic high, differential amplifier 800a is connected via PMOS transistors 803 and 804 to the bit lines PABIT[i] 738 and $\overline{\text{PABIT[i]}}$ 739, so that differential amplifier 800 can detect a voltage difference between these bit lines ("evaluation"). When a voltage difference in the bit lines PABIT[i] 738 and $\overline{\text{PABIT[i]}}$ 739 is detected, line PCHG 802 is driven to logic high, thereby turning off PMOS transfer transistors 803 and 804. Consequently, the differential amplifier 800a is disconnected from the bit lines PABIT[i] 738 and $\overline{\text{PABIT[i]}}$ 739 to restore the differential amplifier 800a to the pre-evaluation state. However, in accordance with the present invention, logic circuits are provided when TLBKILL is asserted (i.e. TLB 103b-3 disabled) to prevent discharge of precharged line $\overline{\text{PCHG}}$ 801, so that the bit lines PABIT[i] 738 and $\overline{\text{PABIT[i]}}$ 739 are disconnected from differential amplifier 800a. Hence, the present invention also provides that no significant dynamic power is consumed at the sense amplifiers of the RAM portion of each entry of the buffer 501.

The above detailed description is provided to illustrate the specific embodiment of the present invention and is not intended to limit the present invention. Many variations and modifications within the scope of the present invention are possible. The present invention is defined by the following claims.

What is claimed is:

1. In a microprocessor, a method for logically removing a translation unit from operation, said translation unit being provided for translating virtual addresses to physical addresses, said translation unit receiving a virtual address tag and a control signal, said control signal selectably having an asserted state or a negated state, said method comprising the steps of:

providing a content addressable memory having a number of locations, each location storing a virtual address tag, said content addressable memory comprising a precharge circuit and (i) a comparator for comparing said virtual address tag received at said translation unit with said stored virtual address tag, and (ii) a precharge circuit including a precharged signal line, said precharged signal line being charged by said precharge circuit prior to said comparison and being discharged by said comparator when said virtual address tag received matches said stored virtual address tag; and, upon said translation unit receiving said control signal in said asserted state:
  (i) remapping the virtual address space to operate under a fixed virtual address to physical address mapping scheme; and
  (ii) forcing said virtual address tag received to a predetermined value not matching any virtual address tag stored in said content addressable memory.

2. The method of claim 1 further comprising the step of suppressing a detection of a TLB exception condition.

3. The method of claim 1 wherein the step of remapping the virtual address further comprises the step of modifying a cacheable memory indicator.

4. The method of claim 1, further including the step of providing a random access memory having a number of locations, each location of said random access memory corresponding to a location of said content addressable memory, said location of said random access memory storing a physical address, said random access memory including a precharged output bus for outputting said physical address at one of said locations of said random access memory and a circuit responsive to said control signal for prohibiting discharge of said precharged output bus.

5. A method as in claim 1, wherein said content addressable memory includes a comparator for each location of said content addressable memory.

6. In a microprocessor a method for logically removing a translation unit from operation, said translation unit being provided for translating virtual addresses to physical addresses, said translation unit receiving a plurality of input signals and including a plurality of precharged signal lines, each of said precharged signal lines being set to a charged state or a discharged state during an evaluation phase in response to logic states of said plurality of input signals, said method comprising the steps of:

remapping the virtual address space to operate under a fixed virtual address to physical address mapping scheme; and
  forcing said plurality of input signals of said translation unit to predetermined logic states, such that said plurality of precharged signal lines are not discharged during said evaluation phase;
  wherein said plurality of input signals includes input address lines to a plurality of content addressable memory (CAM) cells and an enable signal for enabling precharge of word lines of said CAM cells, and wherein said plurality of precharged signal lines include a plurality of output bit lines of random access memory (RAM) cells, said plurality of output bit lines of said RAM cells being coupled to a plurality of sense amplifiers, the step of forcing said plurality of input signals of said translation unit to predetermined logic states comprises the steps of:
  setting said input address lines to predetermined logic states, and deasserting said enable signal so as to prevent said word lines of said CAM cells from being precharged, and
  disconnecting said plurality of sense-amps from said plurality of output bit lines.

7. The method of claim 6 wherein each of said CAM cells receives as input signals both a selected one of said inputt address lines and a complementary signals of said selected input address line, the step of setting said input address lines comprises the step of forcing both said selected one of said input address line and said complementary signal to a selected logic value.

8. In a microprocessor, a circuit for logically removing a translation unit from operation, said translation unit being provided for translating virtual addresses to physical addresses, said translation unit receiving a virtual address tag and a control signal, said control signal having an asserted state or a negated state, said circuit for logically removing a translation unit from operation comprising:

a content addressable memory having a number of locations, each location storing a virtual address tag, said content addressable memory comprising a precharge circuit and (i) a comparator for comparing said virtual address tag received with said stored virtual address tag, and (ii) a precharged signal line, said precharged signal line being charged by said precharge circuit prior to said comparison and being discharged by said comparator when said virtual address tag received matches said stored virtual address;
  a circuit, in response to said control signal, for remapping the virtual address space to operate under a fixed virtual address to physical address mapping scheme; and
  a circuit for forcing, in response to receiving at said translation unit said asserted state of said control signal, said virtual address tag received to a predetermined value not matching any virtual tag stored in said content addressable memory.

9. The circuit of claim 8 further comprising means for suppressing detection of TTLB exception condition.

10. The circuit of claim 8, further comprising means for modifying a cacheable memory indicator.

11. The circuit of claim 8, further including a random access memory having a number of locations, each location of said random access memory corresponding to a location of said content addressable memory, said location of said random access memory storing a physical address, said random access memory comprises:

a precharged output bus for output said physical address at one of said locations of said random access memory; and
  a disabling circuit, said disabling circuit prohibiting discharge of said precharged output bus in response to said control signal.

12. A method as in claim 8, wherein said content addressable memory includes a comparator for each location of said content addressable memory.

13. In a microprocessor, a circuit for logically removing a translation unit from operation, said translation unit being provided for translating virtual addresses to physical addresses, said translation unit receiving a plurality of input signals and including a plurality of precharged signal lines, each of said precharged signal line being set to a charged state or a discharged state during an evaluation phase in response to logic states of said plurality of input signals, said circuit for logically removing a translation unit from operation comprising:

a circuit for remapping the virtual address space to operate under a fixed virtual address to physical address mapping scheme; and a circuit for forcing said plurality of input signals of said translation unit to predetermined states, such that said plurality of precharged signal lines of said translation unit are not discharged during said evaluation phase;

wherein said plurality of input signals includes input address lines to a plurality of content addressable memory (CAM) cells and an enable signal for enabling precharge of word lines of said CAM cells, and wherein said plurality of precharged signal lines include a plurality of output bit lines of random access memory (RAM) cells, said plurality of output bit lines of said RAM cells being coupled to a plurality of sense amplifiers, said circuit for forcing said plurality of input signals of said translation unit to predetermined logic states further comprising:

a circuit for setting said input address lines to predetermined logic states;

a circuit for deasserting said enable signal so as to prevent said word lines of said CAM cells from being precharged, and a circuit for disconnecting said plurality of sense-amps from said plurality of output bit lines of said RAM cells.

14. A circuit for logically removing a translation unit from operation, as in claim 13, wherein each of said CAM cells receives as input signals both a selected one of said input address lines and a complementary signal of said selected input address line, said circuit for setting said input address lines further comprising a circuit for forcing both said selected input address line and said complementary signal to a selected logic value.

* * * * *